United States Patent [19]

Chu et al.

[11] Patent Number: 4,753,995

[45] Date of Patent: Jun. 28, 1988

[54] COMPOSITIONS OF LINEAR POLYETHYLENE AND POLYVINYLIDENE FLUORIDE FOR FILM EXTRUSION, AND FILMS THEREOF

[75] Inventors: Shaw-Chang Chu, Belle Mead; Richard G. Shaw, Piscataway, both of N.J.

[73] Assignee: Mobil Oil Corporation, New York, N.Y.

[21] Appl. No.: 901,698

[22] Filed: Aug. 29, 1986

[51] Int. Cl.$^4$ .................. C08L 23/18; C08L 23/20; C08L 27/16
[52] U.S. Cl. ............................................. 525/199
[58] Field of Search ......................................... 525/199

[56] References Cited

U.S. PATENT DOCUMENTS 3,125,547  3/1964  Blatz ................................. 525/199

OTHER PUBLICATIONS

Mitsubishi-abstract of Japanese Pat. No. 61085-457A, (1-5-86).

*Primary Examiner*—Carman J. Seccuro
*Attorney, Agent, or Firm*—Alexander J. McKillop; Michael G. Gilman; Charles J. Speciale

[57] ABSTRACT

The extrudability of linear polymers of ethylene such as low density copolymers of ethylene and $C_4$–$C_{10}$ olefins (LLDPE) into thin films is improved by adding small amounts, e.g., 0.02 to 2 weight percent polyvinylidene fluoride to reduce melt fracture, head pressure and to obtain films having excellent anti-blocking characteristics.

4 Claims, No Drawings

COMPOSITIONS OF LINEAR POLYETHYLENE AND POLYVINYLIDENE FLUORIDE FOR FILM EXTRUSION, AND FILMS THEREOF

BACKGROUND OF THE INVENTION

Linear ethylene polymers such as low density polyethylenes (LLDPE) are widely used in the extrusion of films because of their superior properties compared to high pressure polyethylene (LDPE). However, there are persistent problems in the commercial exploitation of LLDPE resins due to difficulties in extrusion. For example, high back pressure and torque due to extremely high shear viscosity of the linear ethylene polymer are encountered. Furthermore, the extruded films exhibit surface distortion related to melt fracture. Accordingly, much effort has been devoted to finding additives, modifying extrusion conditions and changing die materials in order to alleviate some of the problems. For example, U.S. Pat. No. 3,125,547, which is incorporated by reference, discloses the use of a hexafluoropropylene-vinylidene fluoride copolymer as a film processing aid and broadly suggests a variety of other fluorinated polymers for the same purpose.

This invention relates to the use of polyvinylidene fluoride which improves the extrusion characteristics of linear ethylene polymers by reducing melt fracture and head pressure, and results in a film having excellent anti-blocking characteristics.

SUMMARY OF THE INVENTION

The extrudability of linear polymers of ethylene into thin films is improved by adding a polyvinylidene fluoride homopolymer in small amounts sufficient to reduce melt fracture, head pressure, and to give films having reduced blocking. The invention relates to both polymer compositions and the films made by extrusion of the compositions and having improved anti-blocking properties.

DETAILED DESCRIPTION OF THE INVENTION

The linear ethylene polymers which are suitable for use in this invention are known materials which are widely commercially available. The preparation of suitable polymers is described in U.S. Pat. No. 4,076,698, which is incorporated herein by reference. Suitable polymers are generally prepared under low pressure conditions using Ziegler-Natta catalysts or chromium oxide catalysts. The linear polymers are either homopolymers of ethylene or copolymers of ethylene and higher alpha-olefins containing 4 to 10 carbon atoms. This invention is particularly concerned with linear low density polyethylenes which are copolymers having a density between 0.90 and 0.94, preferably between 0.91 and 0.93.

Generally, the polyvinylidene fluoride homopolymer should have melt flow characteristics similar to that of the linear polyethylene polymer so that the fluorocarbon polymer can be easily dispersed in the polyethylene. The weight average molecular weight of the fluorocarbon polymer should be in the range of 20,000 to 1,000,000, preferably between 40,000 to 500,000.

The polyvinylidene homopolymer can be blended with the linear ethylene polymer in any suitable manner. It has been found to be advantageous to prepare a masterbatch containing the linear ethylene polymer which is rich in the polyvinylidene fluoride polymer for blending with additional ethylene polymer to achieve the desired concentration of the additives.

The invention is illustrated by the following non-limiting examples.

EXAMPLES 1-6

The linear low density polyethylene (LLDPE) used in all the examples was an ethylene-butene copolymer having a density of 0.918 and a melt index of 1 which exhibits severe melt fracture under commercial narrow die gap extrusion conditions. The polyvinylidene fluoride used in the examples had a weight average molecular weight of about 50,000 (Kynar 720 obtained from the Pennwalt Corporation). The hexafluoropropylenevinylidene fluoride polymer used in the control examples was Viton A from E. I. du Pont de Nemours and Company.

Blocking force of the films containing various amounts of the fluoropolymer was measured according to the ASTM method (D-3354) on five samples of each film, averaged and reported in the Table below.

TABLE

| Example | Wt. % | Grams Blocking Force (KYNAY) | (Control) Grams Blocking Force (VITON A) |
| --- | --- | --- | --- |
| 1 | 2.0 | 27.9 | 94.7 |
| 2 | 1.0 | 55.9 | 101 |
| 3 | 0.5 | 85.5 | 108 |
| 4 | .25 | 115 | 120 |
| 5 | 0.1 | 119 | 130 |
| 6 | 0.04 | 130 | 133 |

All samples exhibited the absence of melt fracture which is obtained when the same polymer is extruded under the same conditions without fluorocarbon polymer but the Kynar (polyvinylidene fluoride) examples give films having less blocking than the Viton counterparts.

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

We claim:

1. An extruded film comprising a linear copolymer of ethylene and a higher olefin containing 4 to 10 carbon atoms, having a density of 0.90 to 0.94, and 0.02 to 2 weight percent of polyvinylidene fluoride homopolymer and having reduced blocking compared to a film of the same copolymer of ethylene containing the same weight of hexafluoropropylene-vinylidene fluoride copolymer.

2. The film of claim 1 in which said linear polyethylene is a copolymer of ethylene and butene having a density of 0.90 and 0.94.

3. The film of claim 1 in which said linear polyethylene is a copolymer of ethylene and hexene having a density of 0.90 and 0.94.

4. The film of claim 1 in which said linear polyethylene is a copolymer of ethylene and octene having a density of 0.90 and 0.94.

* * * * *